Figure 1:
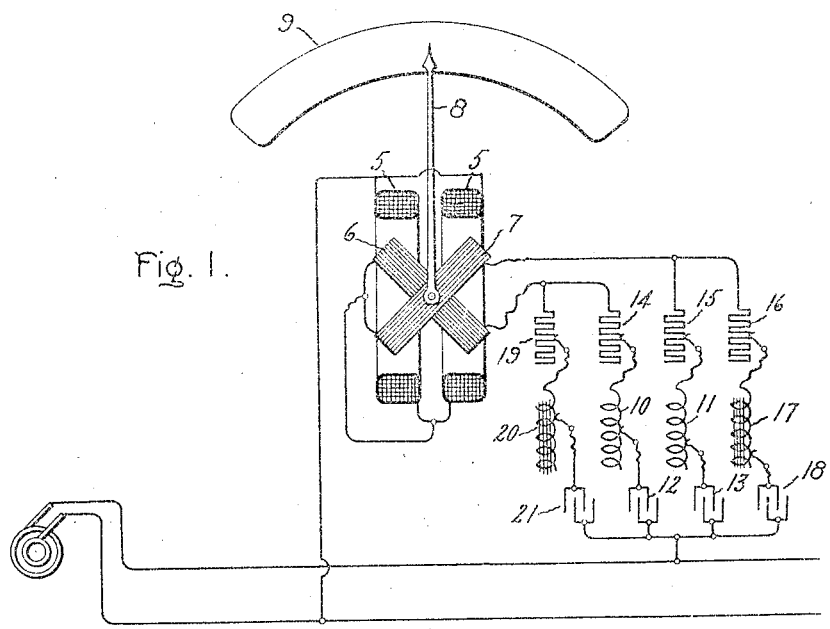

D. R. PRICE.
FREQUENCY INDICATOR.
APPLICATION FILED JULY 13, 1912.

1,156,491.

Patented Oct. 12, 1915.

WITNESSES:
Benjamin B. Hull
Helen Oxford

INVENTOR:
DAVID R. PRICE,
BY
HIS ATTORNEY.

UNITED STATES PATENT OFFICE.

DAVID R. PRICE, OF LYNN, MASSACHUSETTS, ASSIGNOR TO GENERAL ELECTRIC COMPANY, A CORPORATION OF NEW YORK.

FREQUENCY-INDICATOR.

1,156,491.  Specification of Letters Patent.  Patented Oct. 12, 1915.

Application filed July 13, 1912. Serial No. 709,240.

*To all whom it may concern:*

Be it known that I, DAVID R. PRICE, a citizen of the United States, residing at Lynn, county of Essex, State of Massachusetts, have invented certain new and useful Improvements in Frequency-Indicators, of which the following is a specification.

My invention relates to instruments for indicating the frequency of alternating current circuits, and in particular to that type of frequency indicator disclosed in the application of William H. Pratt, filed September 1, 1911, Serial No. 650,226.

The instrument described in the application above identified depends for its operation upon the change in impedance at different frequencies of two partially tuned circuits, each of which is connected to a separate winding. The two windings constitute one of two relatively movable elements of the instrument. The combined action of the currents in each winding determines the final position of the movable element, and indicates, by means of a pointer and scale, the frequency. In instruments of this character, it has been found that false indications are likely to result from the lack of torque in the tuned windings at frequencies differing largely from the frequencies for which the circuits of these windings are tuned. At these abnormal frequencies, the circuits of both windings are far out of tune, and since little current flows in the circuits under such conditions, the torque of each winding is very small. This is particularly noticeable when the frequency drops well below the minimum frequency marked on the instrument scale, and thus below the minimum frequency for which the circuits of the instrument windings are tuned. Such a condition exists when the generator plant is being shut down or started up. At such times, both of the winding circuits are far out of tune; which condition, together with the phase interference in the two circuits themselves, brings the indicator, actuated by the movable element, again on the scale, thereby registering incorrectly.

The object of my invention is to overcome in a simple and effective manner such false indications when the frequency is outside of the normal range of the instrument. I accomplish this object by providing in connection with the circuit of each winding, an auxiliary circuit, the effect of which is to increase the torque of its respective winding at certain predetermined frequencies. The auxiliary circuits contain devices for reducing to a minimum the flow of current in these circuits at frequencies within the range of the instrument. At abnormal frequencies, however, these devices permit a sufficient flow of current in the auxiliary circuits to develop a torque in the high or low frequency winding, according as the abnormal frequency is high or low, so as to hold the pointer off the scale. In general the auxiliary circuits will contain resistance, inductance and capacity, although under certain conditions it is not necessary that the auxiliary circuits contain all three of these devices.

In practice it is ordinarily only necessary to provide against false indications at very low frequencies, and to this end I preferably provide an auxiliary circuit containing resistance, inductance and capacity in parallel with the tuning devices of the winding which causes the indicator to move toward the lower part of the instrument scale. This auxiliary circuit is so adjusted that it produces an extra torque which assists the down-pulling main circuit to hold the pointer off the scale until the proper frequency is reached.

If frequencies far higher than those for which the instrument is designed are likely to be encountered, a second auxiliary circuit containing a properly adjusted amount of resistance, inductance and capacity is provided in parallel with the circuit of the winding which causes the movable member to move to the higher part of the scale. Further modifications of my invention will be described in greater detail hereafter.

The novel features which I believe to be characterized by my invention will be definitely indicated in the claims appended hereto. The features of construction and mode of operation will be understood by reference to the following description taken in connection with the accompanying drawings which show the preferred embodiments of my invention and in which,—

Figure 2:
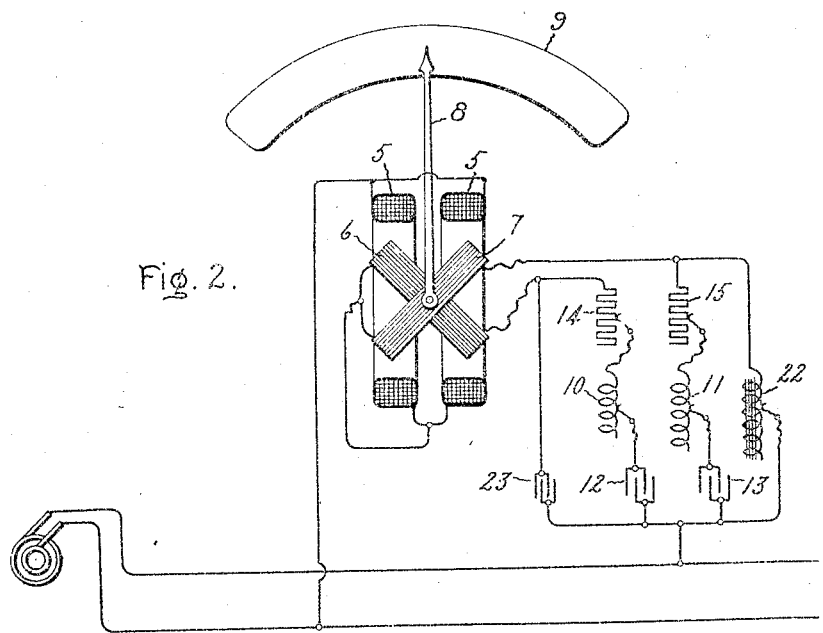

Figure 1 shows diagrammatically a frequency indicator embodying the novel features of my invention, and Fig. 2 shows a modified form of such features.

The indicator consists of two coils 5—5, forming a stationary winding or stationary element. The movable elements consist of two coils 6 and 7 positioned at an angle to one another. These coils are pivotally mounted and carry a needle or indicator 8 which coöperates with a scale 9. The windings of the movable element are connected in parallel with each other and in series with the stationary element. Included in the parallel circuit of each winding are devices for tuning the circuits to a given frequency. These devices are represented by reactances 10 and 11, condensers 12 and 13, and resistances 14 and 15. The relative amount of reactance, capacity and resistance in the parallel circuits is preferably adjustable, as is indicated diagrammatically by the adjustable contacts in connection with the reactances and resistances. By means of these devices, the circuits of windings 6 and 7 are tuned for different frequencies, the circuit of winding 6 being tuned for a higher frequency than that of winding 7. The windings 6 and 7 are placed at an angle to each other and connected so as to exert opposing forces on the stationary coils 5—5.

In parallel with the tuning devices of the lower frequency winding 7, are placed an adjustable resistance 16, an adjustable reactance 17 and a condenser 18, arranged in series. These latter devices are tuned for a frequency far below that for which devices 11, 13, and 15 are tuned. Under these conditions, the torque tending to turn the movable element toward the lower end of the scale will be accentuated at the lower frequency for which the devices 16, 17 and 18 are tuned, and thus there will be no tendency for the pointer to move back on the scale at frequencies far below that for which the circuit of winding 7 is normally tuned. In parallel with the tuning devices of the higher frequency winding 6, are placed the adjutable resistance 19, the adjustable reactance 20 and the capacity 21, and the circuit of this auxiliary winding is tuned for a frequency considerably higher than that for which the main circuit, containing the devices 10, 12 and 14, is tuned.

The auxiliary circuit 16, 17 and 18 is put in resonance at some frequency between zero and the lowest division on the scale of the instrument, and the auxiliary circuit, 19, 20 and 21 is put in resonance at some frequency considerably above the highest division on the scale of the instrument. When the frequency drops to an abnormally low value, the circuit 16, 17 and 18 will approach resonance and will therefore take a greater current, thus producing in the winding 7 a torque sufficient to keep the pointer 8 off the scale. When the frequency is abnormally high, the auxiliary circuit 19, 20 and 21 performs a similar function.

The tuning of the auxiliary circuits should not be sharp, but should be gradual so that these circuits will take a considerable current over a fairly wide range of frequency. When the tuning is sharp the auxiliary circuits have little effect except at particular frequencies, and the results attained are more or less uncertain. To produce this gradual tuning, the inductances are provided with iron cores having a considerable hysteresis loss and are worked at a very high density.

It is probable that the interaction of all four circuits of the instrument is responsible for the final result, as it is necessary to have the proper phase on the auxiliary circuits, since otherwise these circuits will further increase the tendency of the pointer to indicate incorrectly instead of working properly. The phase relation of the currents in the circuits can be restricted by the adjustable resistances, and it has been found that these devices are very necessary and important for this purpose.

It is evident that the auxiliary devices 19, 20 and 21 may be omitted, where very high frequencies are not likely to be encountered. This is usually the condition in practice, since it is only the abnormally low frequencies that are ordinarily encountered.

In Fig. 2, I have shown a slight modification, in which the desired results are obtained by inserting a relatively large reactance 22 in parallel with the tuning devices of the circuit of winding 7, and a relatively small condenser 23 in parallel with the tuning devices of the circuit of winding 6. At lower frequencies, the reactance will take more current than at higher frequencies, and accordingly at lower frequencies, the torque of winding 7 will be sufficient to keep the pointer 8 off the scale. While, on the other hand, at very high frequencies, the condenser 23 will cause the winding 6 to carry a greater current, and will thus increase its torque, thereby holding the pointer 8 off the scale. In this manner, false indications at frequencies far above or far below that for which the instrument is designed will be avoided. This device is, however, not as satisfactory under all conditions as that shown in Fig. 1, since at certain particular frequencies it fails to accomplish the desired results.

I do not desire to limit myself to the particular construction and arrangement of parts shown and described, but aim in the appended claims, to cover all modifications which are within the scope of my invention.

What I claim as new and desire to secure by Letters Patent of the United States, is:—

1. A frequency indicator comprising relatively movable elements, one of said elements having two windings exerting opposing forces on the other element, means for tuning the circuit of each of said windings for different frequencies, means for accentuating the torque of one of said windings at frequencies differing considerably from the frequency for which the circuit of said winding is tuned, and indicating means actuated by the movable element.

2. A frequency indicator comprising relatively movable elements, one of said elements having two windings exerting opposing forces on the other element, means for tuning the circuit of one of said windings for one frequency, means for tuning the circuit of the other winding for a lower frequency, means for accentuating the torque exerted by said last mentioned winding at frequencies lower than that for which the circuit of said winding is tuned, and indicating means actuated by the movable element.

3. A frequency indicator comprising relatively movable elements, one of said elements having two windings exerting opposing forces on the other element, means for tuning the circuit of one of said windings for relatively high frequencies, means for tuning the circuit of the other winding for relatively low frequencies, means for accentuating the torque exerted by said first winding at frequencies far higher than that for which the circuit of said winding is tuned, means for accentuating the torque exerted by said second winding at frequencies far lower than that for which the circuit of said winding is tuned, and indicating means actuated by the movable element.

4. A frequency indicator comprising relatively movable elements, one of said elements having two windings exerting opposing forces on the other element, means for tuning the circuit of each of said windings for different frequencies, auxiliary means for tuning the circuit of one of said windings for a still different frequency, and indicating means actuated by the movable element.

5. A frequency indicator comprising relatively movable elements, one of said elements having two windings exerting opposing forces on the other element, means for tuning the circuit of one of said windings for one frequency, means for tuning the circuit of the other winding for a lower frequency, an inductance in parallel with said last mentioned means, and indicating means actuated by the movable element.

6. A frequency indicator comprising relatively movable elements, one of said elements having two windings exerting opposing forces on the other element, means for tuning the circuits of the two windings for two different frequencies, said two frequencies being relatively above and below the average frequency to be measured, means for accentuating the torque of the winding tuned for the lower frequency at frequencies far below the frequency for which the circuit of said winding is tuned, and indicating means actuated by the movable element.

7. A frequency indicator comprising relatively movable elements, one of said elements having two windings exerting opposing forces on the other element, a device in series with each winding for adjusting the impedance of the circuits of said windings, additional devices in parallel to one of said first mentioned devices for further adjusting the impedance of the circuit of one of said windings, and indicating means actuated by the movable elements.

8. A frequency indicator comprising relatively movable elements, one of said elements having two windings exerting opposing forces on the other element, a reactance and a condenser in series with each of said windings, a reactance and a condenser in parallel with the reactance and condenser of one of said windings, and indicating means actuated by the movable element.

9. A frequency indicator comprising relatively movable elements, one of said elements having two windings exerting opposing forces on the other element, a reactance and a condenser in series with each of said windings, a resistance, a reactance and a condenser in parallel with the reactance and condenser of one of said windings, and indicating means actuated by the movable element.

10. A frequency indicator comprising relatively movable elements, one of said elements having two windings exerting opposing forces on the other element, means for tuning the circuit of each of said windings for different frequencies, a reactance in parallel with the tuning devices of one of said circuits, said reactance having a large hysteresis loss, and indicating means actuated by the movable element.

In witness whereof, I have hereunto set my hand this 10th day of July, 1912.

DAVID R. PRICE.

Witnesses:
JAMES H. CAMPBELL,
LAURA McLAREN.